US012544783B2

(12) United States Patent
Roop et al.

(10) Patent No.: US 12,544,783 B2
(45) Date of Patent: Feb. 10, 2026

(54) METHOD AND SYSTEM FOR PRODUCING A PATH AND PAINTING AN OBJECT ALONG THE PATH

(71) Applicant: AXALTA COATING SYSTEMS IP CO., LLC, Wilmington, DE (US)

(72) Inventors: Robert K. Roop, King of Prussia, PA (US); Ashish Jawadiwar, New Brunswick, NJ (US); Anthony J. Calabria, Thornton, PA (US); John R. Moore, Lansdale, PA (US); Robert V. Canning, Jr., Bear, DE (US); Bryant C. Jeffrey, Middletown, DE (US); Neil R. Murphy, Audubon, NJ (US); Jonathan A. Antal, Philadelphia, PA (US); Praveen Thiagarajan, Wilmington, DE (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 0 days.

(21) Appl. No.: 18/722,499

(22) PCT Filed: Dec. 20, 2022

(86) PCT No.: PCT/US2022/082053
§ 371 (c)(1),
(2) Date: Jun. 20, 2024

(87) PCT Pub. No.: WO2023/122614
PCT Pub. Date: Jun. 29, 2023

(65) Prior Publication Data
US 2025/0144656 A1 May 8, 2025

Related U.S. Application Data

(60) Provisional application No. 63/265,940, filed on Dec. 23, 2021.

(51) Int. Cl.
*B05B 13/04* (2006.01)
*B05B 16/00* (2018.01)
(Continued)

(52) U.S. Cl.
CPC .......... *B05B 13/0431* (2013.01); *B05B 16/90* (2018.02); *B05C 11/1021* (2013.01);
(Continued)

(58) Field of Classification Search
CPC .. B05B 13/0431; B05B 16/90; B05C 11/1021
See application file for complete search history.

(56) References Cited

U.S. PATENT DOCUMENTS

| 10,577,100 | B2 | 3/2020 | Beardsley et al. |
| 2002/0046699 | A1* | 4/2002 | Congard ............. B05B 12/1454 |
| | | | 427/427.2 |

(Continued)

FOREIGN PATENT DOCUMENTS

| CN | 110369241 A | 10/2019 |
| EP | 1114677 A1 | 7/2001 |

(Continued)

*Primary Examiner* — Nathan T Leong
(74) *Attorney, Agent, or Firm* — Ingrassia Fisher & Lorenz, LLP

(57) ABSTRACT

Methods and systems for robotically painting an object are provided. In one example, the method includes providing a scanner-robot arrangement. The scanner-robot arrangement includes a 3-D scanner, a robot, and at least one processor. The object is detected and an area to be painted is determined with the 3-D scanner in communication with the at least one processor. A robot path for painting the area is produced using the at least one processor. An applicator is held offset from the area of the object with the robot in communication with the at least one processor. The applicator is in fluid communication with a paint source that contains paint. The applicator is moved along the robot path with the robot in communication with the at least one (Continued)

processor while depositing the paint from the applicator onto the area of the object.

19 Claims, 2 Drawing Sheets

(51) Int. Cl.
*B05C 11/10* (2006.01)
*B05D 1/02* (2006.01)
*B25J 11/00* (2006.01)
*B25J 15/00* (2006.01)
*B25J 15/04* (2006.01)
*B25J 19/02* (2006.01)

(52) U.S. Cl.
CPC ............ *B05D 1/02* (2013.01); *B25J 11/0075* (2013.01); *B25J 15/0019* (2013.01); *B25J 15/04* (2013.01); *B25J 19/021* (2013.01)

(56) References Cited

U.S. PATENT DOCUMENTS

| | | |
|---|---|---|
| 2002/0124799 A1 | 9/2002 | Thome et al. |
| 2015/0147460 A1* | 5/2015 | Manzi .................. B05B 12/122 |
| | | 118/713 |

FOREIGN PATENT DOCUMENTS

| | | |
|---|---|---|
| JP | 2017154095 A | 9/2017 |
| JP | 2017154096 A | 9/2017 |
| JP | 2017159261 A | 9/2017 |
| JP | 2021164917 A | 10/2021 |

* cited by examiner

METHOD AND SYSTEM FOR PRODUCING A PATH AND PAINTING AN OBJECT ALONG THE PATH

CROSS-REFERENCE TO RELATED APPLICATIONS

This application is a U.S. National-Stage entry under 35 U.S.C. § 371, based on International Application No. PCT/US22/82053, filed Dec. 20, 2022 which was published under PCT Article 21(2) and which claims priority to and all benefits of U.S. Provisional Application No. 63/265,940, filed Dec. 23, 2021, the contents of which are incorporated by reference herein in their entirety.

TECHNICAL FIELD

The technical field relates generally to coatings, and more particularly to methods and systems for producing a robot path and painting an object with an applicator (e.g., spray gun or other applicator that applies paint) that is operatively coupled to a robot that moves the applicator along the robot path.

BACKGROUND

A paint booth is a structure that provides a ventilated, air filtered and temperature-controlled environment in which painting of an object can take place. A paint booth is necessary for the safe execution of such activities, since painting includes dispensing paint components such as solvents and particulate material that must not enter the atmosphere in large quantities. As such, the environment within the paint booth is confined and requires a high level of control and expertise. Trained and experienced personnel, which are often hard to find and retain, require specialized personal protection equipment (PPE) to work in such a hazardous, confined space.

Accordingly, it is desirable to provide methods and systems for painting an object that address one or more of the foregoing issues. Furthermore, other desirable features and characteristics of the present disclosure will become apparent from the subsequent detailed description and the appended claims, taken in conjunction with this background.

SUMMARY

Methods and systems for robotically painting an object are provided herein. In accordance with an exemplary embodiment, the method includes providing a scanner-robot arrangement. The scanner-robot arrangement includes a 3-D scanner, a robot, and at least one processor in communication with the 3-D scanner and the robot. The method further includes detecting the object with the 3-D scanner in communication with the at least one processor. An area of the object to be painted is determined with the 3-D scanner in communication with the at least one processor. A robot path for painting the area is produced using the at least one processor. An applicator is held offset from the area of the object with the robot in communication with the at least one processor. The applicator is in fluid communication with a paint source that contains paint. The method further includes moving the applicator along the robot path with the robot in communication with the at least one processor while depositing the paint from the applicator onto the area of the object.

In accordance with an exemplary embodiment, the system includes a scanner-robot arrangement. The scanner-robot arrangement includes a 3-D scanner configured to scan the object, a robot, and at least one processor in communication with the 3-D scanner and the robot. The 3-D scanner in communication with the at least one processor are cooperatively configured to detect the object and determine an area of the object to be painted. The at least one processor is operative to produce a robot path for painting the area. The system further includes an applicator that is configured to be in fluid communication with a paint source that contains paint. The robot in communication with the at least one processor are cooperatively configured to hold the applicator offset from the area of the object and to move the applicator along the robot path while depositing the paint from the applicator onto the area of the object.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

The term "overlying," as used herein, means the overlying material may be physically touching the underlying substrate or layer, or the overlying material may be physically separated from the underlying substrate or layer by an intervening material, such as an overlying clearcoat that may be separated from an underlying substrate or layer (e.g., primer layer) by a basecoat. It is understood that a component or object may be rotated or moved, so reference to one component, object, or item (layer) overlying another refers to a particular orientation, with the understanding that the actual component, object, or item (layer) may be rotated into a different orientation.

Figure 1:
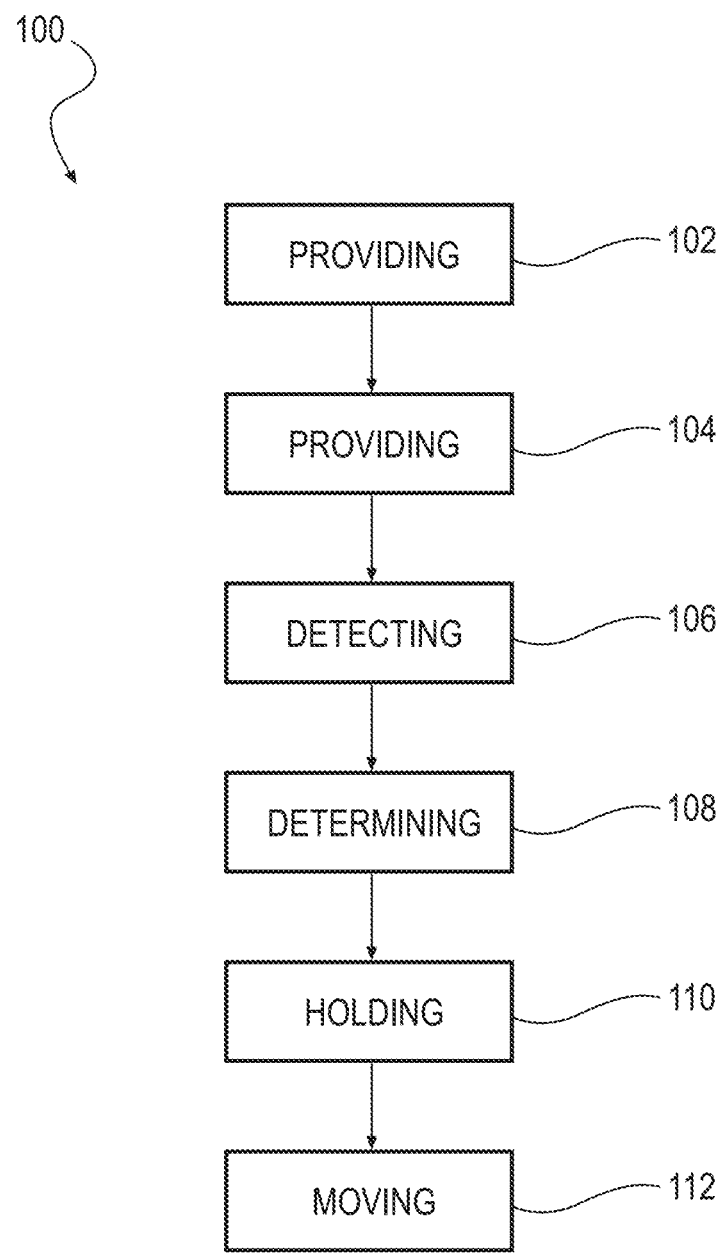
FIG. 1 illustrates a block diagram of a method for robotically painting an object in accordance with an exemplary embodiment.

Various embodiments contemplated herein relate to methods and systems for robotically painting an object. Referring to FIG. 1, a method 100 for robotically painting an object in accordance with an exemplary embodiment is provided. The object may be a part, a component for example a vehicle body or trim panel (e.g., an exterior or interior body or trim panel) that may be free standing, mounted on a fixture or on a vehicle, or an assembly of components, for example a vehicle, a portion thereof, or the like.

In an exemplary embodiment, the method 100 includes providing (STEP 102) a paint booth or an area for painting, which may be inside of the paint booth or just a general area designated for painting. The paint booth is configured as a structure that provides, for example, a ventilated, air filtered and temperature-controlled environment in which painting of the object can take place. The structure includes an opening or door to allow various objects, components, parts, materials, items, and/or the like to be moved into the paint booth and out of the paint booth as needed or otherwise desired, as well as ingress and egress of personnel.

A scanner-robot arrangement is provided (STEP 104). The scanner-robot arrangement includes a 3-D scanner, a robot, and at least one processor in communication with the 3-D scanner and the robot.

The 3-D scanner is configured to scan the object and generate data that corresponds to the surface (e.g., surface data) and/or 3-D shape of the object (e.g., a portion of or all of the object). In an exemplary embodiment, the at least one processor directs the 3-D scanner to scan the object to generate data. As will be discussed in further detail below, the data is communicated back to the at least one processor for processing to determine the surface, an area(s), or portion(s) of the surface, and/or the 3-D shape of the object, and/or to identify the object. In an exemplary embodiment, the 3-D scanner is a non-contact scanner, such as, for example, an ultra-wide band (UWB) scanner, a camera scanner, a time of flight (TOF) camera, a sonic scanner, a laser scanner, and a light detection and ranging laser (LiDAR) scanner. In one example, the 3-D scanner generates a point cloud as data that corresponds to the 3-D shape of the area of the object. In an alternative embodiment, the 3-D scanner is a contact scanner, for example, a probe that physically contacts the surface along a grid pattern to generate wireframe data that corresponds to the surface and/or 3-D shape of the object. In an exemplary embodiment, the 3-D scanner is a combination of a non-contact scanner and a contact scanner.

In an exemplary embodiment, the robot includes a base and an arm that is disposed on the base and that moves along a plurality of axes. The robot may be, for example, a 3-axis, a 4-axis, a 5-axis, a 6-axis, or a 7-axis robot.

In an exemplary embodiment, the at least one processor is part of a computer. The computer may be used as a device to implement the techniques and methods described herein. The computer may include an input device, such as a keyboard, a mouse, electronic communication devices such as a modem, or a variety of other communication devices. The input device communicates with the at least one processor (processing unit) and/or a memory of the computer, where the processing unit and the memory communicate with each other. A wide variety of processing unit and memory embodiments are known to those skilled in the art. The computer also includes an output device. Other exemplary embodiments of an output device include a modem, a printer, or other components known to those skilled in the art. The methods and techniques described below may be implemented on the computer.

A computer readable medium embodies a computer program that may include one or more algorithms, where the computer program directs the computer to implement the method and techniques described below. The computer readable medium may be an SD card, a USB storage medium, a floppy disk, a CD-ROM, a DVD, a hard drive, or other devices that are readable by a computer, and that include memory for saving the computer program. In some embodiments, the computer program may be electronically downloaded to the computer, but the downloaded computer program is saved on a tangible device somewhere.

In an exemplary embodiment, the 3-D scanner is disposed on the robot, for example on the base of the robot, or alternatively, on the arm of the robot. The robot may be provided inside or outside of the paint booth (or area for painting). For example, the robot may be a floor-mounted robot that is disposed inside the paint booth (or area for painting) mounted to the floor at a fixed location. Alternatively, the robot may be a movable robot that is configured to move into and out of the paint booth (or area for painting) as needed. In one example, the 3-D scanner is disposed on the arm of the robot that is mounted on the floor inside the paint booth and that is in communication with the at least one processor to control movement of the arm and consequently the 3-D scanner for scanning the object. In another example, the 3-D scanner is disposed on the base of the robot that is a movable robot and that is in communication with the at least one processor to control movement of the robot and consequently the 3-D scanner for scanning the object. Alternatively, the 3-D scanner may be mounted to the arm of the movable robot, which is in communication with the at least one processor to control movement of the arm and consequently the 3-D scanner for scanning the object.

Alternatively, the 3-D scanner is disposed on a rail-gantry system. The rail-gantry system may be provided inside or outside of the paint booth (or area for painting). The 3-D scanner is operatively coupled to, e.g., movably disposed on, the rail-gantry system, which is in communication with the at least one processor to control movement of the rail-gantry system and consequently the 3-D scanner for scanning the object. In another alternative embodiment, the 3-D scanner is carried by a drone. The drone is movable inside and optionally outside of the paint booth (or area for painting). The 3-D scanner is operatively coupled to, e.g., carried by, the drone, which is in communication with the at least one processor to control movement (e.g., flight, landing, and etc.) of the drone and consequently the 3-D scanner for scanning the object.

In an exemplary embodiment, the 3-D scanner, while in communication with the at least one processor, detects (STEP 106) or otherwise finds the object. For example, the object may be moved into the paint booth (or area for painting) into a general area. Alternatively, the object may be outside of the paint booth (or area for painting) in a general area nearby the paint booth (or area for painting). The 3-D scanner, whether disposed on the robot or a rail-gantry system, scans the general area including the object and communicates the scan data to the at least one processor, which uses the scan data to find the object in the general area including the position and/or orientation of the object.

As discussed above, the at least one processor directs the 3-D scanner to scan and collect surface data of the object, which is communicated back to the at least one processor for processing to determine the surface and/or 3-D shape of the object, and/or to identify the object. Further, the 3-D scanner and the at least one processor cooperate to determine (STEP 108) an area(s) of the object to be painted. For example, the at least one processor is operable to run an algorithm that directs the at least one processor to evaluate the data to determine the 3-D shape of the object. The at least one processor may evaluate the surface data and/or 3-D shape using the algorithm and identify an area(s) or portion(s) of the surface of the object that requires or otherwise needs a paint repair and/or refinishing.

In an exemplary embodiment, an identifier is applied (e.g., manually, or otherwise) about the area of the object (e.g., partially or fully surrounding the area that needs a paint repair and/or refinishing) to be painted. Non-limiting examples of identifier include a non-contact sensing device, such as, a radiofrequency identification (RFID) tape, a colored tape, an RFID tag, an ultra-wide band (UWB) device, a color contrasting border, and/or a polygonal border including corners or other tape or border masking materials that can be readily identified by the 3-D scanner in communication with the at least one processor. In an exemplary embodiment, the object is scanned including the identifier with the 3-D scanner and using the positional data of the identifier, the at least on processor determines the area to be painted. For example, the at least one processor may recognize a polygonal shaped RFID tape border and determine that the area positioned inside of the RFID tape border is the area to be painted.

Alternatively, or additionally, the at least one processor may be in communication with and access a database. The database contains, for example, a plurality of various parts/objects including a plurality of corresponding 3-D shapes, areas and/or portions of the surfaces of the various parts/objects, for example unfinished or at least partially unpainted parts/object, which require painting or additional painting. In an exemplary embodiment, the at least one processor matches the surface data and/or 3-D shape to a specific part/object (e.g., matches the surface data/3-D shape to the corresponding 3-D shape of a specific part/object) in the database including the corresponding area to be painted.

In an exemplary embodiment, the at least one processor whether using an algorithm and/or a database, determines the specific paint formulation(s) including color and any special effects, and parameters (e.g., process parameters or process specifications including speed, index, offset distance, air pressure, number of coats, flash time, drop generation frequency and/or etc.) to be used to paint the area of the object. In an exemplary embodiment, using the at least one processor, the color of the paint is selected by any one of (1) scanning a vehicle identification number (VIN) with the 3-D scanner or an additional scanner that is in communication with the at least one processor that accesses a database to retrieve the color and paint formulation, (2) measuring the color of the object using a color measuring device that is in communication with the at least one processor, which accesses a database to retrieve a paint formulation, (3) inputting a color code for the object to the at least one processor, which accesses a database to retrieve the color and a paint formulation, (4) inputting a part number for the object to the at least one processor, which accesses a database to retrieve the color and a paint formulation, and/or (5) the at least one processor retrieving a color corresponding to the object from a database including the corresponding paint formulation. In one example, a color measuring device is used to measure the color. The color measuring device may measure color and sparkle appearance (e.g., aluminum flake, effect pigment, mica, etc. appearance), for example, at various aspecular angles 15, 45, and/or 110 degrees, including, for instance solid colors defined by a set of 3 color dimensions (i.e. $L^*45$, $a^*45$, and $b^*45$) and effect colors defined by 11 color and sparkle dimensions (i.e. $L^*15$, $a^*15$, $b^*15$, $L^*45$, $a^*45$, $b^*45$, $L^*110$, $a^*110$, $b^*110$, $Sg15$, $Sg45$).

The method 100 continues by producing (STEP 110) a robot path (e.g., path that the robot end of arm follows) for painting the area using the at least one processor. Various embodiments for producing the robot path are provided. In an exemplary embodiment, the robot path is produced by converting the 3-D shape of the area of the object to the robot path using the at least one processor running an algorithm that is operative to generate robot paths corresponding to various 3-D shapes. In another embodiment, the robot path is produced by inputting a 2-D pattern into the at least one processor and using the 3-D shape of the area of the object with the at least one processor running an algorithm to convert the 2-D pattern to the robot path. In yet another embodiment, the robot path is produced by using the data to generate a point cloud that corresponds to the 3-D shape of the area of the object and producing the robot path offset from the point cloud using the at least one processor running an algorithm. In another embodiment, the robot path is produced by using the data to generate a CAD rendering that includes the 3-D shape of the area of the object and producing the robot path offset from the CAD rendering of the 3-D shape of the area using the at least one processor running an algorithm.

As discussed above, during detection and determination of the area(s) of the object to be painted as well as producing the robot path, the object may be inside or outside of the paint booth (or area for painting). In the case in which the object is located outside of the paint booth (or area for painting), the object is then moved inside the paint booth (or area for painting) for painting. In an exemplary embodiment, because the position and/or orientation of the object may have been determined in an area outside of the paint booth (or area for painting), the object is moved and positioned within the paint booth (or area for painting) to a predetermined location known to the at least one processor to avoid re-finding and/or re-detecting the object including its position and/or orientation, so that the area of the object can be accurately painted inside the paint booth (or area for painting). Further, if the robot is a movable robot and is located outside of the paint booth (or area for painting) during detection and determination of the area(s) of the object to be painted, the moveable robot is moved into the paint booth (or area for painting) prior to painting the object.

In an exemplary embodiment, with both the object and the robot disposed inside the paint booth (or area for painting), the method 100 continues by holding (STEP 112) an applicator offset from the area of the object with the robot (e.g., at the end of arm of the robot) in communication with the at least one processor. In an exemplary embodiment, the applicator is a spray gun, for example in a refinishing paint setting/application or alternatively, in an industrial painting setting/application. In another exemplary embodiment, the applicator is a printhead, for example in a refinishing paint setting or alternatively, in an industrial painting setting. In another exemplary embodiment, the applicator is a rotary bell applicator, for example in an industrial painting setting.

Figure 2:
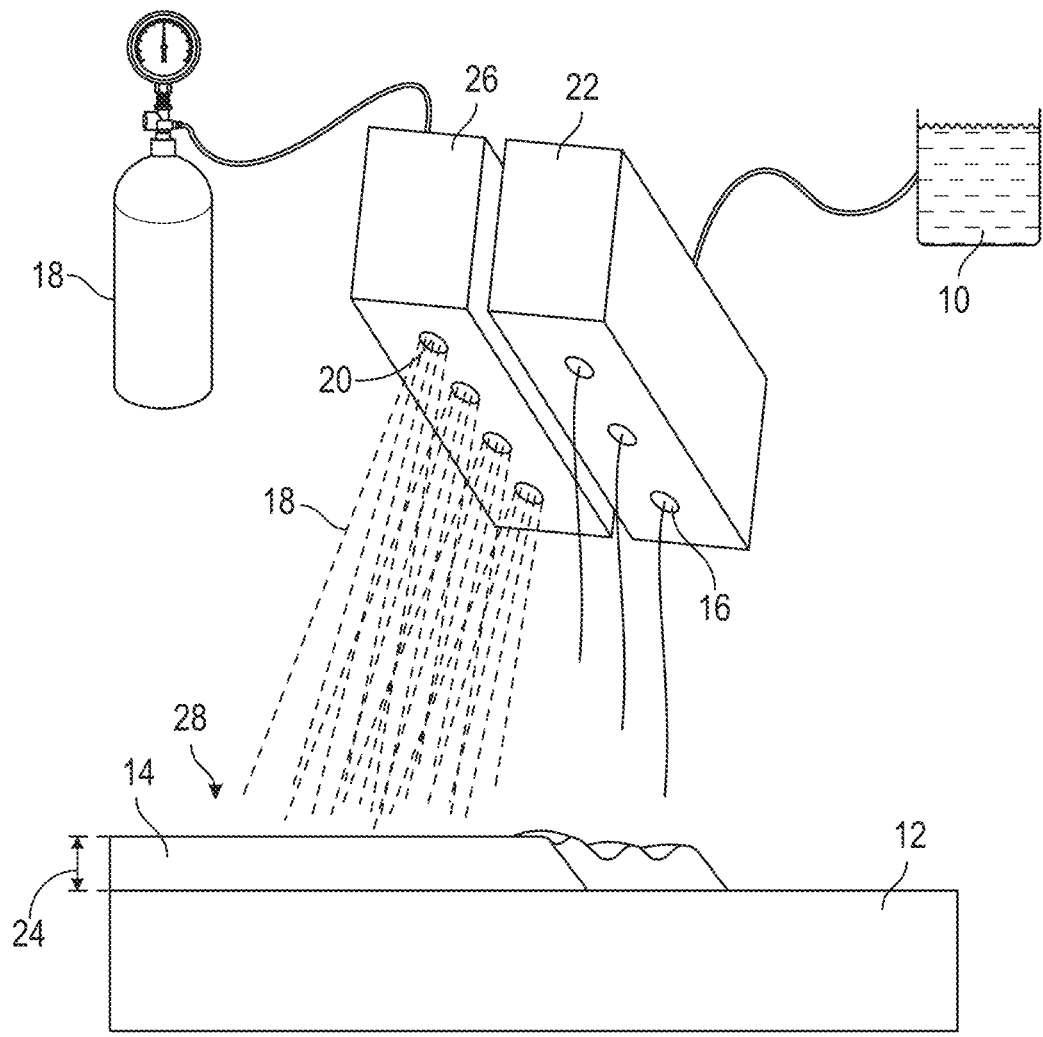
FIG. 2 illustrates a perspective view of an applicator configured as a printhead in accordance with an exemplary embodiment.

Referring to FIG. 2, in an exemplary embodiment, a high transfer efficiency applicator 16 is used for ejecting the coating composition. The coating composition 10 is ejected from one or more nozzles in an engineered/controlled fashion that creates a fine stream, that may or may not breakup into droplets. The fluid stream is targeted to the substrate 12 such that the jet or drops arrive at specific locations to form a continuous film or pattern on the substrate 12. As a result, there is essentially no overspray (drops missing their target) and nearly 100% transfer efficiency (essentially all paint goes to targeted location). In an exemplary embodiment, the transfer efficiency of the coating composition that ends up deposited on the substrate 12 is 99.9% or greater. Some allowance should be made for start-up and stopping the high transfer efficiency applicator 16. Devices of this type have been referred to as drop-on-demand, stream-on demand, overspray-free, or ultra-high transfer efficiency applicators. The high transfer efficiency applicator 16 stands apart from spray atomization techniques where energy, such as pneumatic, hydraulic, or centrifugal energy, is introduced to create a partially controlled, random distribution of droplet sizes, trajectories, and speeds. Some additional mechanism (electrostatics and or shaping air) may then guide the coating composition 10 droplet cloud to the substrate 12. In the case of paint spray, there is always some overspray and transfer efficiency loss.

In an exemplary embodiment, the high transfer efficiency applicator 16 is housed in or comprises part of a print head assembly 22. The print head assembly 22 may comprise one or more than one high transfer efficiency applicators 16 in different embodiments. The coating composition 10 is pressurized and ejected from the high transfer efficiency applicator 16 toward the substrate 12 to form the coating layer 14 on the substrate 12. The print head assembly 22 does not touch or make contact with the substrate 12 during application of the coating composition 10, and, accordingly, remains spatially separate from the substrate 12 during application of the coating layer 14. The coating layer 14 has a coating layer thickness 24, and the coating layer thickness 24 may vary over a length and/or width of a coating layer surface 28. In an exemplary embodiment, the print head assembly 22 is positioned or located at a distance of from 1 to about 30 millimeters from the substrate 12 during application of the coating composition 10. The print head assembly 22 may be controlled to move over the substrate 12, making a plurality of subsequent passes to provide the coating layer 14 overlying the substrate 12, where the coating layer 14 and the substrate 12 may both be wider than the print head assembly 22. In an alternate embodiment, a plurality of print head assemblies 22 may be utilized to apply the coating layer 14. In one embodiment, a second applicator 26 may be used to apply fluid 18 (e.g. gas, shaping air) may be applied from a jet 20 onto the surface 28 the coating layer 14.

Referring to FIG. 1, the applicator is in fluid communication with a paint source that contains paint. The paint formulation may be, for example, a primer formulation, the sealer formulation, a basecoat formulation, a clearcoat formulation, a topcoat formulation, and/or the tint coat formulation. Non-limiting examples of various ingredients that may be present in the paint formulation include one or more types of resins, such as an acrylic resin, an epoxy resin, a polyurethane resin, and/or the like, various additives, promoters, curing agents, a water and/or solvent-based carrier that flashes off during drying or curing of the paint formulation, colorants, pigments, such as effect pigment flakes, interference flakes, colored pigments, and/or the like.

In an exemplary embodiment, the method 100 continues by moving (STEP 114) the applicator along the robot path with the robot (e.g., via moving the arm of the robot) in communication with the at least one processor while depositing (for example via a spray (e.g., atomized) or a stream, or the like) the paint from the applicator onto the area of the object. In an exemplary embodiment, the applicator is moved over the surface of the area of the object along the robot path to provide complete coverage of the area at a desired coating thickness of the paint.

In an exemplary embodiment, the applicator is a first applicator, the paint source is a first paint source, and the paint is a first coating. The method 100 includes moving the first applicator along the robot path with the robot in communication with the at least one processor while depositing the first coating from the first applicator onto the area of the object. The method 100 continues by optionally allowing the first coating to flash after being deposited onto the area of the object, and by releasing the first applicator from the robot. A second applicator is held offset from the area of the object with the robot in communication with the at least one processor. The second applicator is in fluid communication with a second paint source that contains a second coating. The second applicator is moved along the robot path with the robot in communication with the at least one processor while depositing the second coating from the second applicator onto the area of the object overlying the first coating.

In an exemplary embodiment, the method 100 continues by optionally allowing the second coating to flash after being deposited onto the area of the object and releasing the second applicator from the robot. A third applicator is held offset from the area of the object with the robot in communication with the at least one processor. The third applicator is in fluid communication with a third paint source that contains a third coating. The third applicator is moved along the robot path with the robot in communication with the at least one processor while depositing the third coating from the third applicator onto the area of the object overlying the second coating. In an exemplary embodiment, the third coating is optionally allowed to flash, and the first, second, and third coatings are cured. In an exemplary embodiment, multiple layers of the first coating, the second coating, and independently the third coating may be deposited. Further, in an exemplary embodiment, the first coating, the second coating, and the third coating are independently selected from the group of a primer, the sealer, a basecoat, a clearcoat, a topcoat, and/or the tint coat.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It is understood that various changes may be made in the function and arrangement of elements described in an exemplary embodiment without departing from the scope of the disclosure as set forth in the appended claims.

What is claimed is:

1. A method for robotically painting an object, the method comprising the steps of:
    providing a scanner-robot arrangement that comprises a 3-D scanner, a robot, and at least one processor in communication with the 3-D scanner and the robot;
    detecting the object with the 3-D scanner in communication with the at least one processor;
    determining an area of the object to be painted with the 3-D scanner in communication with the at least one processor;
    producing a robot path for painting the area using the at least one processor;
    holding an applicator offset from the area of the object with the robot in communication with the at least one processor, wherein the applicator is in fluid communication with a paint source that contains paint; and
    moving the applicator along the robot path with the robot in communication with the at least one processor while depositing the paint from the applicator onto the area of the object.

2. The method of claim 1, wherein detecting the object comprises scanning the object with a 3-D scanner to generate data, and wherein determining an area of the object to be painted comprises the at least one processor using the data to determine a 3-D shape of the object.

3. The method of claim 2, wherein producing the robot path comprises at least one of: (i) converting the 3-D shape of the area of the object to the robot path using the at least one processor running an algorithm that is operative to generate robot paths corresponding to various 3-D shapes; (ii) inputting a 2-D pattern into the at least one processor and using the 3-D shape of the area of the object with the at least one processor running an algorithm to convert the 2-D pattern to the robot path; (iii) using the data to generate a point cloud that corresponds to the 3-D shape of the area of the object and producing the robot path offset from the point cloud using the at least one processor running an algorithm; and (iv) using the data to generate a CAD rendering that includes the 3-D shape of the area of the object and producing the robot path offset from the CAD rendering of the 3-D shape of the area using the at least one processor running an algorithm.

4. The method of claim 1, wherein the method further comprises the step of applying an identifier about the area of the object to be painted, wherein detecting the object comprises scanning the object including the identifier with the 3-D scanner, and wherein determining the area comprises the at least one processor using the identifier to determine the area to be painted.

5. The method of claim 4, wherein the identifier comprises a non-contact sensing device selected from a radiofrequency identification (RFID) tape, a colored tape, an RFID tag, an ultra-wide band (UWB) device, a color contrasting border, a polygonal border including corners, or a combination thereof.

6. The method of claim 1, further comprising the step of determining process parameters for painting the paint using the at least one processor, and wherein moving the applicator comprises applying the process parameters for painting the area of the object with the paint.

7. The method of claim 6, wherein the process parameters are selected from speed for moving the applicator, indexing, offset distance, air pressure to the applicator, number of coats for depositing the paint, flash time, drop generation frequency, or a combination thereof.

8. The method of claim 1, further comprising the step of selecting a color of the paint using the at least one processor, preferably wherein selecting the color of the paint comprises one of:
scanning a vehicle identification number (VIN) with the 3-D scanner or an additional scanner that is in communication with the at least one processor;
measuring the color of the object using a color measuring device that is in communication with the at least one processor;
inputting a color code for the object to the at least one processor;
inputting a part number for the object to the at least one processor;
retrieving a color corresponding to the object from a database; or
a combination thereof.

9. The method of claim 1, wherein the applicator is a first applicator, the paint source is a first paint source, and the paint is a first coating, and moving the applicator comprises moving the first applicator along the robot path with the robot in communication with the at least one processor while depositing the first coating from the first applicator onto the area of the object, and wherein the method further comprises the steps of:
releasing the first applicator from the robot;
holding a second applicator offset from the area of the object with the robot in communication with the at least one processor, wherein the second applicator is in fluid communication with a second paint source that contains a second coating; and
moving the second applicator along the robot path with the robot in communication with the at least one processor while depositing the second coating from the second applicator onto the area of the object overlying the first coating.

10. The method of claim 9, further comprises the steps of:
releasing the second applicator from the robot;
holding a third applicator offset from the area of the object with the robot in communication with the at least one processor, wherein the third applicator is in fluid communication with a third paint source that contains a third coating; and
moving the third applicator along the robot path with the robot in communication with the at least one processor while depositing the third coating from the third applicator onto the area of the object overlying the second coating.

11. The method of claim 1, wherein: (i) the applicator is a spray gun or a print head; (ii) the method is performed in a refinishing paint application; (iii) the 3-D scanner is a contact scanner, a non-contact scanner, or a combination thereof; or (iv) any combination of (i)-(iii).

12. The method of claim 1, wherein the 3-D scanner is a non-contact scanner, wherein the non-contact scanner is one of an ultra-wide band (UWB) scanner, a camera scanner, a time of flight (TOF) camera, a sonic scanner, a laser scanner, and a light detection and ranging laser (LiDAR) scanner.

13. The method of claim 1, further comprising the step of:
providing an area for paining; and
moving the object into the area for painting prior to holding and moving the applicator, and wherein holding and moving the applicator comprises holding and moving the applicator with the robot disposed in the area for painting to deposit the paint onto the area of the object.

14. The method of claim 1, further comprising providing the object including an identifier;
wherein detecting the object comprises scanning the object including the identifier with the 3-D scanner to generate data;
wherein determining the area comprises the at least one processor using the data and the identifier to determine the area to be painted.

15. The method of claim 14, wherein using the identifier to determine the area to be painted comprises using positional data of the identifier.

16. The method of claim 15, wherein the identifier comprises a non-contact sensing device selected from a radiofrequency identification (RFID) tape, a colored tape, an RFID tag, an ultra-wide band (UWB) device, a color contrasting border, a polygonal border including corners, or a combination thereof.

17. The method of claim 14, further comprising:
moving the object, after the steps of detecting the object and determining the area of the object to be painted, and before the steps of holding the applicator displaced from the area of the object and moving the applicator along the robot path; and
re-finding the object in a general area including the position and/or orientation of the object with the 3-D scanner in communication with the at least one processor, after the step of moving the object.

18. The method of claim 1, wherein determining the area of the object to be painted comprises evaluating surface data and/or 3-D shape using an algorithm and identifying an area of the surface of the object that requires a paint repair and/or refinishing.

19. The method of claim 1, wherein the at least one processor is not in communication with a database containing a plurality of various areas of surfaces of various objects which require painting.

* * * * *